United States Patent [19]

Mosch

[11] 4,202,565

[45] May 13, 1980

[54] RETRACTABLE OVERHEAD GUARD

[75] Inventor: Duane L. Mosch, Muscatine, Iowa

[73] Assignee: HON Industries Inc., Muscatine, Iowa

[21] Appl. No.: 911,787

[22] Filed: Jun. 2, 1978

[51] Int. Cl.$^2$ ........ B60J 7/24

[52] U.S. Cl. ........ 280/756; 296/102; 414/914

[58] Field of Search ........ 296/102, 107; 280/756; 180/68.5; 187/9 R; 214/DIG. 7; 414/914

[56] References Cited

U.S. PATENT DOCUMENTS

| | | | |
|---|---|---|---|
| 2,263,981 | 11/1941 | Dalecke et al. | 280/756 |
| 3,021,174 | 2/1962 | Rund | 296/107 |
| 3,436,118 | 4/1969 | Duncan | 296/102 |
| 3,713,688 | 1/1973 | Monroe | 296/107 |
| 3,827,532 | 8/1974 | Minich, Jr. et al. | 296/107 |
| 3,844,382 | 10/1974 | Mecklenburg | 280/756 |
| 4,026,597 | 5/1977 | Miller | 296/107 |
| 4,047,750 | 9/1977 | Samide | 296/107 |

*Primary Examiner*—David M. Mitchell
*Attorney, Agent, or Firm*—Neuman, Williams, Anderson & Olson

[57] ABSTRACT

A retractable overhead guard assembly is provided to protect an operator of industrial trucks, such as a fork-lift operator, from falling objects. Said guard is retractable from a raised to a lowered position for operation in areas of low overhead clearance. A pair of substantially parallel extensible supports are attached to said truck. A guard is mounted on the upper ends of the supports and is manually slideable between a forward and rearward position and is maintained in either position by a locking mechanism. Said supports may include biasing means such as springs to counterbalance the weight of the guard and facilitate manual adjustment between raised and lowered positions. A locking mechanism is also provided on each support to retain the guard in a plurality of positions. Electrical interlocks prevent the raising of the lift beyond a predetermined height if the guard is not in the rearward and raised position where it offers maximum protection to the operator.

11 Claims, 7 Drawing Figures

FIG. 1
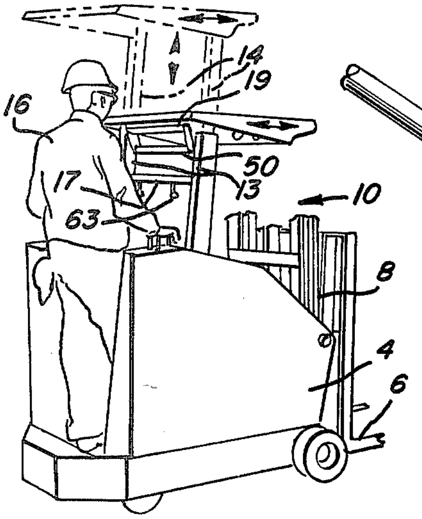
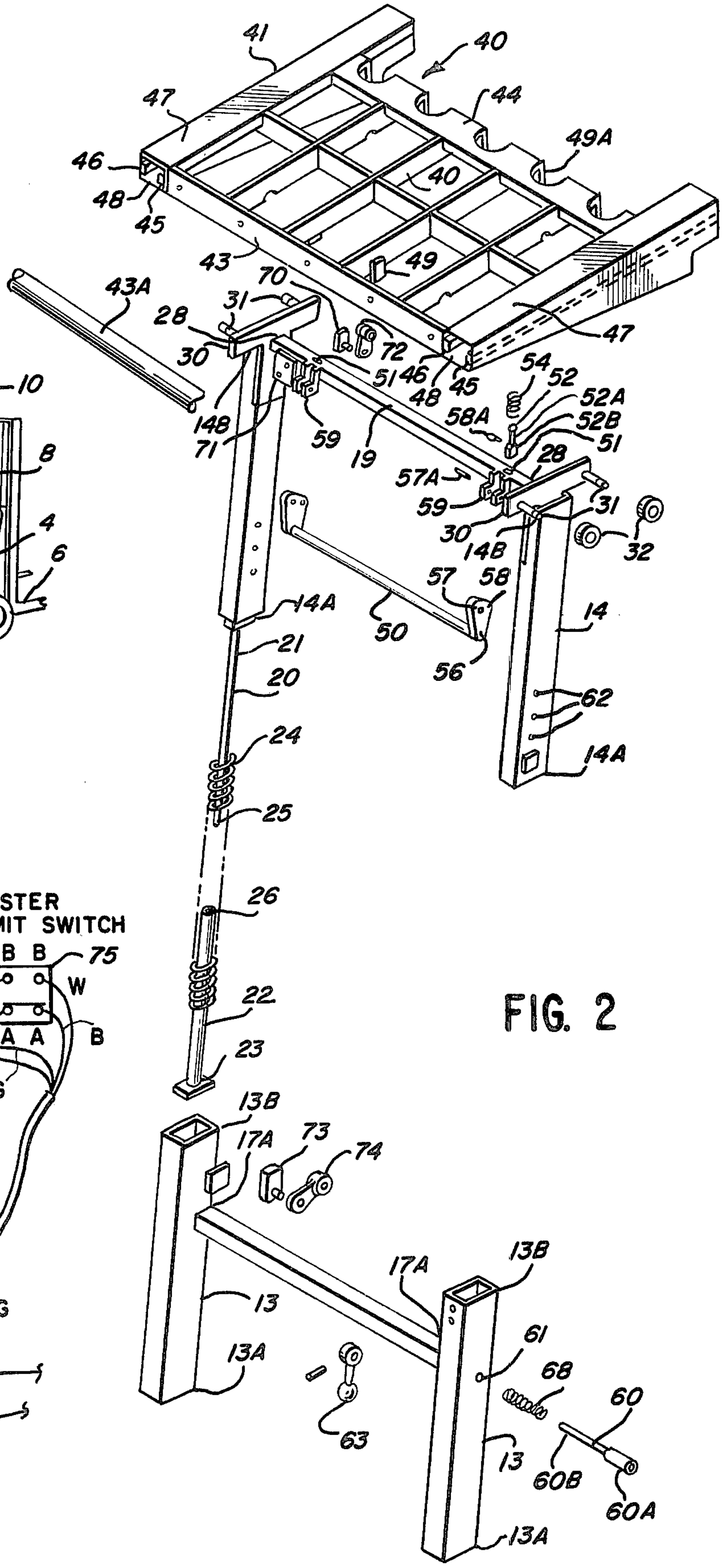
FIG. 2
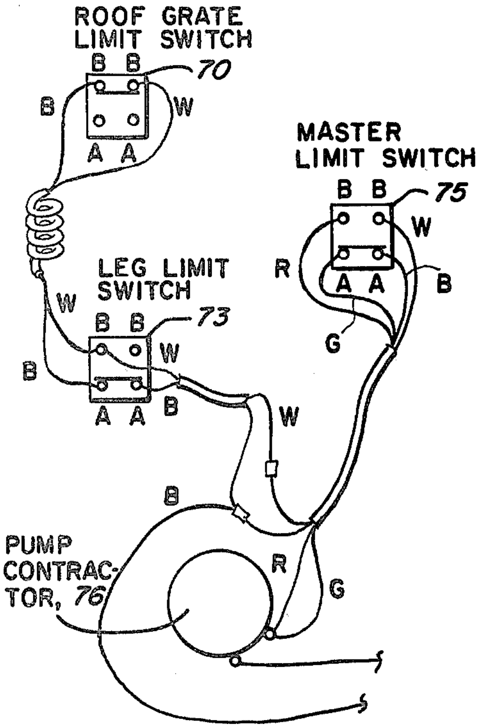
FIG. 3

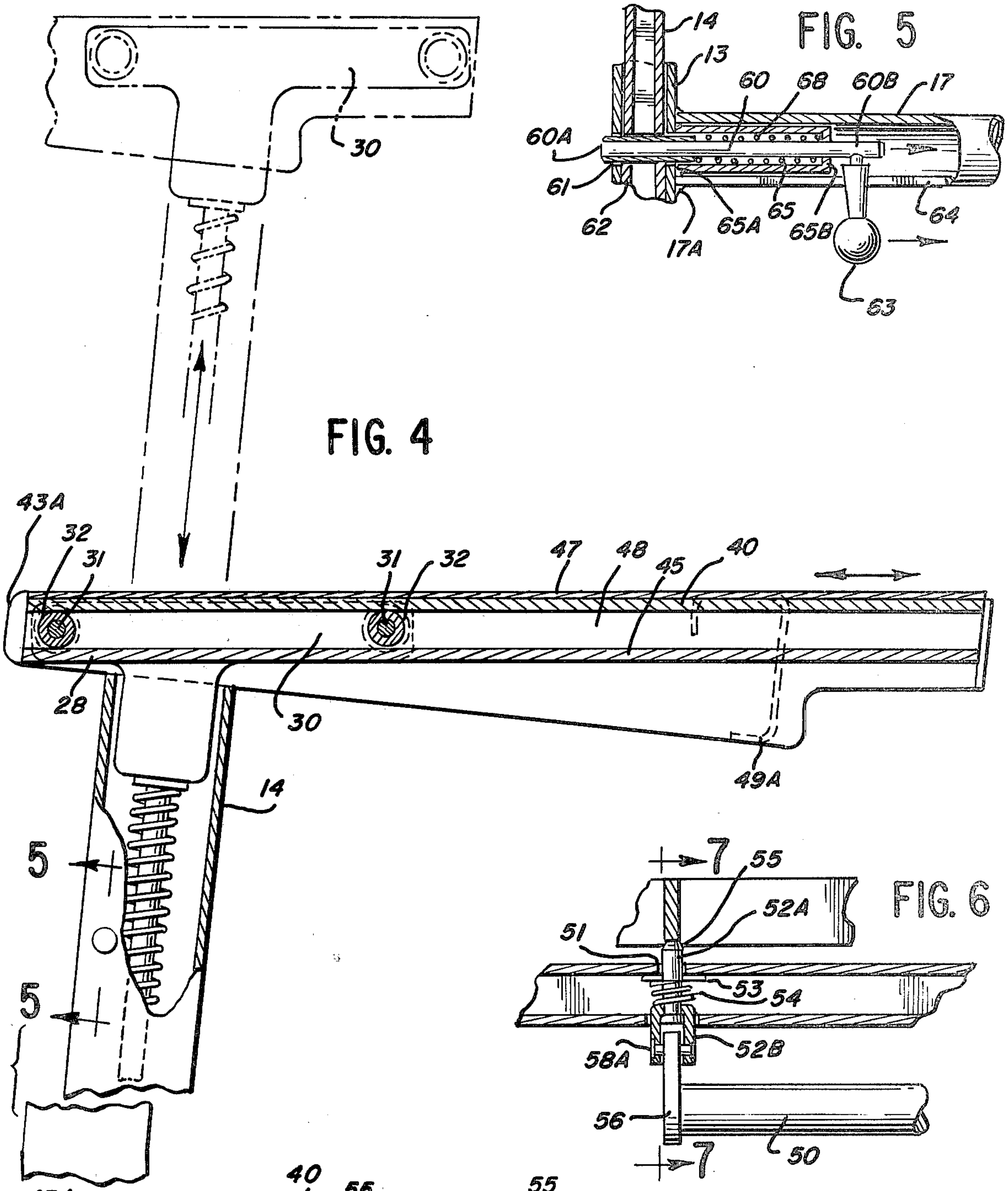
FIG. 5
FIG. 4
FIG. 6
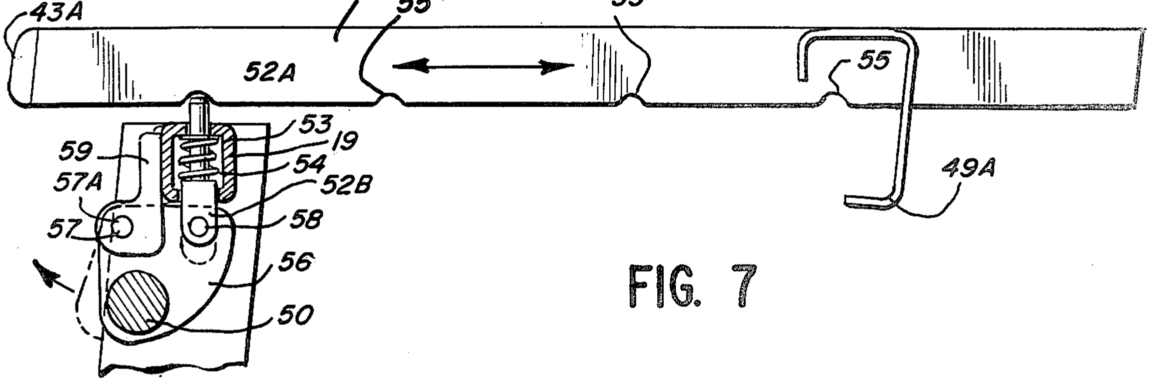
FIG. 7

RETRACTABLE OVERHEAD GUARD

BACKGROUND OF THE INVENTION

This invention relates generally to industrial trucks and more particularly to retractable overhead guards for such trucks. Such a guard may be lowered for operation of the truck in areas of low clearance, and further may be manually lowered or raised.

For vehicles such as lift trucks it is desireable to provide an overhead guard to protect the operator from falling objects. This guard must extend above the vehicle a sufficient distance to provide headroom for the operator. However, in areas of low clearance, whether in a storage area or access areas, the presence of a rigid, non-collapsing guard severly limits the usefulness and efficiency of such a vehicle. A retractable guard allows operation of the vehicle in open as well as restricted areas and may provide operator protection in both situations.

Many such guards have been designed for larger industrial trucks. They are generally quite large to cover the entire truck except for the lifting forks and, accordingly, are rather massive and bulky. This size and mass requires extra support legs, hinders the removal of batteries and other routine maintenance operations, and makes manual adjustment, if possible at all, cumbersome and dangerous. Many of these guards may be adjusted only with hydraulic or other mechanical assistance, which drains battery energy and reduces the efficiency of both the machine and operator. Others require complex or exotic linkages to position the guard or maintain it in position. See, for instance, U.S. Pat. Nos. 2,263,981, issued to Dalecke, et al.; 3,827,532, issued to Minick, Jr. et al.; 4,026,597, issued to Miller et al.; and 4,047,750, issued to Samide et al. Still other vehicles may have retractable guards, but when the guard is lowered the truck is rendered inoperable due to restrictions on the operator's movement, positioning, or view. See, for instance, U.S. Pat. Nos. 3,713,688, issued to Monroe; 3,827,532, issued to Minick Jr., et al.; 4,026,597, issued to Miller et al.; and 4,047,750, issued to Samide.

OBJECTS OF THE INVENTION

It is an object of the present invention to provide an improved retractable overhead guard for industrial truck type vehicles, and particularly one which effectively reduces the overall height of the vehicle to allow operation in areas of relatively low overhead clearance.

It is a further object of the present invention to provide an overhead guard which is easily retracted and raised manually.

It is still a further object of the present invention to provide a horizontally moveable overhead guard.

It is still a further object of the present invention to provide an overhead guard with safety interlocks to prevent the operator from raising the forks of the vehicle beyond a particular height when either the guard is not in a position superposed to the operator or the guard is in its lowered position.

It is still a further object of the present invention to provide an overhead guard with positive action locks which retain the guard in the desired position and alert the operator if the lock is not properly seated.

It is still a further object of the present invention to provide an overhead guard which is relatively simple in construction to provide for ease of operation and maintenance for both the guard and the vehicle.

It is still a further object of the present invention to provide an overhead guard which, in either its retracted or extended position, does not lengthen the industrial vehicle or otherwise restrict its usefulness.

SUMMARY OF THE INVENTION

The invention is embodied in a retractable overhead guard assembly for an industrial vehicle. The invention includes generally vertically extending support means having a lower portion secured to the vehicle, and an upper portion selectively extensible upwardly and retractable downwardly relative to said lower portion. An overhead operator guard is supported on the upper portion for vertical adjustment therewith as the upper portion of the support means is extended and retracted relative to said lower portion. The overhead operator guard is mounted on the upper portion of the support means for generally horizontal movement between a first position superposed to the operator's position for protecting the operator thereat, and a second position displaced from said first position so that the upper portion of the support means and guard may be retracted adjacent to the operator.

The overhead guard assembly may include a guard lock to prevent movement of said guard. Similarly, the overhead guard assembly may include a support lock to prevent movement of the upper portion relative to the lower portion. The support means may also include biasing means to facilitate manual extension and retraction by counterbalancing the weight of the guard and appurtenant mechanisms or structure. Electrical interlocks prevent the raising of the lift beyond a predetermined height if the guard is not in a raised rearward position.

DESCRIPTION OF THE DRAWINGS

FIG. 1 is a perspective view of an industrial vehicle showing an overhead guard, employing teachings of this invention, in the lowered position and also showing in a phantom manner the guard in the raised position.

FIG. 2 is an exploded drawing showing the guard assembly of FIG. 1.

FIG. 3 is a block diagram showing limit switches used to prevent raising the vehicle forks above a preselected height when the guard is not in a position offering maximum operator protection.

FIG. 4 is a partially cutaway view showing a support leg, roller assembly, and an overhead guard in the lowered position, and also showing in phantom manner a support leg and roller assembly in the raised position.

FIG. 5 is a partial cutaway view showing a locking means for a support leg.

FIGS. 6 and 7 are partial cutaway views showing a release bar and a locking means for the guard.

DESCRIPTION OF THE PREFERRED EMBODIMENT

As seen in FIG. 1 of the drawings, a vehicle, such as an electric battery powered lift truck 4, is shown with lifting forks 6 attached to a telescoping mast lifting mechanism 8, and including a retractable overhead guard assembly 10. The lifting mechanism 8 is powered and operates in a conventional manner. Neither the vehicle 4 nor the lift mechanism forms a part of the present invention except insofar as they relate to the guard mechanisms.

The overhead guard assembly 10 includes a pair of lower supports 13 attached to the lifting truck 4. Nested within each of said lower supports 13 is an upper support 14 which extends and retracts vertically with respect to said lower support 13 and is connected, via a horizontal slide mechanism, to an overhead guard 40. The overhead guard 40 is shown in its lowered forward position in FIG. 1 where it maintains minimum height for use in areas of low overload clearance. The same guard is also shown in phantom lines in its raised rearward position over the operator 16 where it offers maximum protection from falling objects.

Connected between the lower leg supports 13 and, in the preferred embodiment, substantially perpendicular thereto is a lower crossbar 17. Depending from said crossbar 17 are leg lock release handles 63 which are connected for operation of the leg lock mechanism described further hereinafter. Connected between said upper leg supports 14 and, in the preferred embodiment, substantially perpendicular thereto is an upper crossbar 19. Depending from said crossbar 19 is an overhead guard release bar 50 which is connected for operation of the guard lock mechanism also described further below.

Referring now to FIG. 2, the lower support members 13 are hollow box-shaped members substantially parallel to one another and rigidly connected by the lower crossbar 17. The lower ends 13A of the supports 13 are attached to the vehicle in any suitable manner. Telescopically nested within each of the lower supports 13 is one of the upper supports 14, which are also hollow box-shaped members. Said upper supports 14 are substantially parallel to one another, and each is collinear with its corresponding lower support 13. The supports 14 are rigidly connected by the upper crossbar 19. End 14A of each support 14 fits telescopically within the open upper end 13B of the respective lower support 13. Shims or wear pads may be provided on the supports 13 and 14 as necessary. While the preferred embodiment disclosed herein uses hollow box-like members, tubes, pipes, channels, or the like are also suitable as desired.

Depending from the lower end 14A of each upper support 14 (but illustrated only on one support for clarity) is a guide post 20. Said guide post 20 is attached at its first end 21 to support the end 14A and is collinear with the respective support 14. Nested within lower support 13 is a guide pipe 22 which is attached at its first end 23 to the support end 13A and is collinear with the respective support 13. A compression spring 24 surrounds the guide pipe 22 and abuts against the lower support end 13A and the upper support end 14A. The lower end 25 of the guide post 20 fits inside the upper opening 26 of the guide pipe 22 and slides therein as the end 14A slides within the support 13. A corresponding spring and guide structure (not shown) is included in the other support column. The compression springs 24 counterbalance the weight of the upper supports 14, the overhead guard 15, and the appurtenant mechanisms. As convenient, said counterbalancing mechanism may be modified so the spring 24 extends to the second end 14B of the support 14. Also, any suitable substitute for the spring 24, such as a compressed gas cylinder, may be utilized.

Referring now to FIGS. 2 and 4, at the junctions 28, where the upper supports 14 meet the upper crossbar 19, there are means allowing generally horizontal movement of said guard relative to said upper supports. The preferred embodiment discloses roller assembly plates 30 attached to each of said supports 14 and extending at substantially right angles to said supports 14. A pair of roller posts 31 extend outwardly from each roller plate 30 substantially perpendicular to said plate 30. Rollers 32 are positioned on each of said four roller posts 31 and secured in position by conventional means. The distance between the roller posts 31 on any one plate 30 is sufficient to prevent rocking of an overhead guard 40 which is supported on those rollers.

The guard 40 is provided as the actual overhead protection for the vehicle operator. While the preferred embodiment discloses a rectangular grate with its opposite sides 41 and 42 substantially parallel, as may be ends 43 and 44, the guard 40 may take one of many forms, as long as it provides the structural integrity to shield the operator from falling objects. Both sides 41 and 42 are generally channel shaped and have inner ribs 45 and 46 on the side flanges which, with the top plate 47, form roller channels 48 parallel to the sides 41 and 42. The channels 48 retain therein and guide the rollers 32 to allow the grate 40 to roll in the direction of said channels. A first stop 49 depends from the guard 40 in the proximity of the end 43 and prevents the guard 40 from sliding forward off the rollers 32 by abutting against one side of the upper crossbar 19. A second stop 49A depends from the guard 40 in the proximity of the end 44 and prevents the guard 40 from sliding rearward off the rollers 32 by abutting against the opposite side of upper crossbar 19. A pad 43A is attached to the end 43 to further protect the operator.

As may be seen from FIG. 4, the axis of a line drawn connecting the centers of the roller pins 31 is not exactly perpendicular to the upper support 14, and this angle may be varied as desired for the various applications for the present invention. It is desireable to maintain guard 40 and its path of forward and rearward movement generally parallel to the usual vehicle operating surface.

Referring now to FIGS. 2, 6 and 7, the details of the release bar and locking means for the guard are illustrated. The upper crossbar 19 has openings 51 situated at each end near the upper supports 14. A guard locking pin 52 comprises a relatively narrow pin portion 52A which protrudes through the opening 51 and a relatively wide, U-shaped saddle portion 52B connected to a pin portion 52A and which extends below the crossbar 19. A compression spring 54 is coiled about the lock pin 52 with one end bearing against a key or collar 53 on the pin 52 and the opposite end bearing against the inside of the crossbar 19 to bias the pin 52 in the upward position towards the guard 40. Said guard 40 has a series of recesses or apertures 55 to receive the pin portion 52A and thereby prevent the guard 40 from freely rolling fore and aft. A guard lock release bar 50 is provided with an end plate 56 attached at each end whereby this bar 50 is pivotally attached to the crossbar 19. Each end plate 56 has a bracket aperture 57 and a lock pin aperture 58 spaced apart from each other and from the release bar 50. Each bracket is rotatably connected, by a pin 57A in aperture 57, to a guard lock release bracket 59 which is attached to the upper crossbar 19 adjacent to the opening 51. The saddle 52B of the roof lock pin 52 is pivotally connected to an end plate 56 at the lock pin aperture 58 by a pin 58A. The apertures 57, 58 and the release bar 50 are spaced apart on the end plate 56 so that the vehicle operator may press against the bar 50 to overcome the bias of the springs 54 and pivot the end plates 56 about the pins 57A causing the guard lock pins 52 to disengage themselves from the guard indentations 55 and thereby allow the guard to roll freely fore and aft. When the bar is released, the springs 54 urge the guard lock pins 52 against the guard 40 and into the detents 55 to effect the locking function.

Referring now to FIGS. 2 and 5, the details of the leg support locks, one in each leg, are illustrated. The leg lock pin 60 is located within the lower crossbar 17 and is essentially concentric therewith in the preferred embodiment; however, it may be located at any convenient position on the lower support 13. The leg lock pin 60 comprises a relatively larger diameter portion 60A and a relatively smaller diameter portion 60B. The end 60A of the pin 60 extends through the apertures 61 in the lower support 13, said apertures being concentric with the leg pin 60. The upper support 14 has a plurality of pairs of apertures 62 which selectively align and become concentric with the leg pin 60 as the upper support 14 is extended or retracted. When the apertures 61 and 62 are aligned, the end 60A of the pin 60 may extend therethrough to prevent relative vertical sliding movement of the nested support legs 13 and 14. The leg lock release handles 63 are attached to one end 60B of the leg pin 60 and depend therefrom through the opening 64 in the crossbar 17 so they will be accessible to the operator for selective sliding movement between the extended locking portion of FIG. 5 and a retracted unlocking position. The spring cap 65 is located between the leg lock release handle 63 and the junction 17A of the lower crossbar 17 and the lower support 13. Said cap is concentric with the leg pin 60, and the first end 65A of said cap 65 is rigidly attached to the lower support 13. A compression spring surrounds the leg pin 60. One end bears against the larger end 60A of the pin 60 and the opposite end bears against the second end 65B of the spring cap 65 to urge the pin 60 outwardly to its extended locking position. Engagement of the handle 63 with the ends of the slot 64 limits the movement of the pin 60.

Referring now to FIGS. 2 and 3, there are shown two limit switches to prevent the raising of the vehicle forks above a predetermined height if either the guard is not in a rearward position or the support legs are not extended. A guard limit switch 70 is attached to a plate 71 on the crossbar 19 so that a switch arm 72 bears against the guard 40 to close the switch only when said guard is in a rearward position superposed to the operator. When the guard is in a forward position, the switch is open. A leg limit switch 73 is attached to the lower support 13 so that an arm 74 extends through an opening in the lower support 13 to detect the presence of the upper support 14. When the upper support 14 is in its fully extended position to raise the guard 40, the leg switch 73 is closed. When the upper support 14 is in a lower position, its presence is sensed by the leg switch 73, which then opens. As shown in FIG. 3, the switches 70 and 73 are wired in series with a master limit switch 75 and a pump contactor 76. When either switch 70 or switch 73 is opened, the pump contactor 76 will limit the height to which the vehicle forks may be raised. As convenient, these switches may be placed or wired to interface with a multitude of lifting mechanisms.

DESCRIPTION OF THE OPERATION OF THE PREFERRED EMBODIMENT

Referring to FIGS. 1 and 2, the guard 40 is normally in its raised and rearward position as shown in the phantom portion of FIG 1. When the guard 40 is in a raised position, the upper supports 14 are in a fully extended position, and the leg lock pins 60 are properly seated in the appropriate apertures 62 to retain the upper supports 14 in said extended position. Accordingly, the leg limit switch 73 is closed allowing the vehicle forks 11 to be raised to their full height if the guard is in a rearward position and the limit switch 70 is also closed. Referring also to FIGS. 4, 6 and 7, when the guard 40 is in its rearwardmost position, the rear stop 49A abuts against the upper crossbar 19. In this position, the roof lock pin 52 is biased into the aperture or indentation 55 by the spring 54 to secure the guard 40 in said position, and the roof limit switch 70 is closed.

When the operator desires to move the guard 40 forward, the guard lock release bar 50 is manually pivoted about the bracket aperture 57 overcoming the bias of the spring 54 and causing the guard lock pins 52 to retract from the apertures or indentations 55. This allows the guard 40 to be moved horizontally on the rollers 32 and be positioned anywhere along the channel 48. When the guard lock release bar 50 is released and returns to its original position due to the bias of the spring 54, the guard lock pins 52 are again biased toward the guard 40 and into a pair of indentations 55 to maintain its position. When the guard 40 leaves said rearward position, the roof limit switch 70 opens and thereby limits the height to which the vehicle forks 11 may be raised.

Referring now to FIGS. 2 and 5, when the operator desires to lower the guard 40 by telescoping the upper supports 14 into the lower supports 13, he moves each of the leg lock release handles 63 to overcome the bias of the springs 68 and withdraws the leg lock pins 60 from the upper support apertures 62. The upper supports 14 will now move freely and manually within the lower supports as aided by the compression springs 24 in each support leg. When the height of the upper support 14 has been readjusted and the apertures 62 in the upper support 14 align with the leg lock pins 60, the pins 60 are returned to their original positions due to the bias of the springs 68 and thereby relock the supports by engaging a selected pair of apertures 62. If the leg lock pins 60 do not properly seat in the apertures, the leg lock release handles 63 will remain in their disengaged positions to alert the operator. As with the guard limit switch 70, when the upper support legs 14 are moved downward from their raised position, the leg limit switch 73 opens and thereby limits the height to which the vehicle forks 11 may be raised.

The invention has been described in detail with particular reference to a preferred embodiment and the operation thereof, but it is understood that variations, modifications, and the substitution of equivalent mechanisms can be effected within the spirit and scope of this invention, particularly in light of the foregoing teachings.

What is claimed is:

1. In a vehicle including a lifting mechanism and having a position for a riding operator, a retractable overhead guard assembly including: generally vertically extending support means having a lower portion secured to said vehicle, and an upper portion selectively extensible upwardly and retractable downwardly relative to said lower portion; an operator guard supported on said upper portion for vertical adjustment therewith as said upper portion is extended and retracted relative to said lower portion; and sliding support means connecting said guard to said upper portion including channel means and channel cooperating roller means for sliding cooperation with said channel means, for generally horizontal selective sliding movement of said guard relative to said upper portion between a first position superposed to said operator position for protecting an operator thereat, and a second position displaced from said first position whereby said upper portion and said guard may be retracted adjacent such an operator.

2. A retractable overhead guard assembly as in claim 1 wherein said vertically extending support means further include an upper portion nested with a lower portion whereby said upper portion telescopes upwardly or downwardly relative to said upper portion.

3. A retractable overhead guard assembly as in claim 2 wherein said vertically extending support means further include: a lower portion including a pair of first elongated members; and an upper portion including a pair of second elongated members corresponding to said pair of first elongated members, each of said members nested with said first members.

4. A retractable overhead guard assembly as in claim 1 including support lock means comprising support lock pins for selectively preventing extension or retraction of said upper portion of said support means.

5. A retractable overhead guard assembly as in claim 4 wherein said support lock means includes: at least one aperture in said lower portion of said support means; a plurality of receptacles in said upper portion of said support means; at least one support lock pin moveable from a first position extending through said aperture into one of said receptacles, and a second position retracted from said receptacle.

6. A retractable overhead guard assembly as in claim 1 further including a support means limit switch responsive to the full extension of said upper portion, whereby said lifting mechanism is capable of lifting to a maximum height only when said upper portion is fully extended.

7. A retractable overhead guard assembly as in claim 1 wherein said roller means are attached to said upper portion and said channel means are attached to said guard for sliding cooperation with said roller means.

8. A retractable overhead guard assembly as in claim 1 further including guard locking means for preventing horizontal movement of said guard relative to said upper portion.

9. A retractable overhead guard assembly as in claim 8 wherein said guard locking means further includes: at least one aperture in said upper portion of said support means; a plurality of recesses in said guard; and at least one guard lock pin selectively moveable from a first position extending through said aperture into one of said recesses and a second position retracted from said recesses.

10. A retractable overhead guard assembly as in claim 1 further including support bias means urging said upper portion of said support means to its extended position and counterbalancing the supported weight of said guard to allow convenient manual extension and retraction.

11. A retractable overhead guard assembly as in claim 1 further including a guard limit switch responsive to the presence of said guard in said first position, whereby said lifting mechanism is capable of lifting to a maximum height only when said guard is in said first position.

* * * * *